United States Patent
Burns et al.

(10) Patent No.: US 7,069,268 B1
(45) Date of Patent: Jun. 27, 2006

(54) SYSTEM AND METHOD FOR IDENTIFYING DATA USING PARALLEL HASHING

(75) Inventors: Barry S. Burns, Cary, NC (US); Jeffery B. Scott, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 619 days.

(21) Appl. No.: 10/341,971

(22) Filed: Jan. 13, 2003

(51) Int. Cl.
*G06F 17/30* (2006.01)

(52) U.S. Cl. .................................. 707/10

(58) Field of Classification Search ........... 707/1–10, 707/100–104.1, 200–206; 370/230, 235, 370/392, 401, 428; 711/165
See application file for complete search history.

(56) References Cited

U.S. PATENT DOCUMENTS

| | | | |
|---|---|---|---|
| 5,960,446 A | 9/1999 | Schmuck et al. | 707/205 |
| 5,987,477 A | 11/1999 | Schmuck et al. | 707/201 |
| 6,023,706 A | 2/2000 | Schmuck et al. | 707/200 |
| 6,263,331 B1 | 7/2001 | Liu et al. | 707/4 |
| 6,393,544 B1 | 5/2002 | Bryg et al. | 711/220 |
| 6,490,666 B1 | 12/2002 | Cabrera et al. | 711/161 |
| 6,690,667 B1 * | 2/2004 | Warren | 370/389 |
| 6,775,281 B1 * | 8/2004 | Brown | 370/392 |
| 6,915,296 B1 * | 7/2005 | Parson | 707/4 |
| 6,928,054 B1 * | 8/2005 | Montuno et al. | 370/235 |

* cited by examiner

*Primary Examiner*—Diane D. Mizrahi
(74) *Attorney, Agent, or Firm*—Baker Botts L.L.P.

(57) ABSTRACT

A method for identifying data is provided that includes receiving a data stream and performing a hashing operation on a portion of the data stream in order to identify a key that reflects an identity associated with the data stream. The method further includes storing a plurality of first and second hash table entries and comparing the key to the first and second hash table entries in order to evaluate if there is a match between the key and the first and second hash table entries.

18 Claims, 2 Drawing Sheets

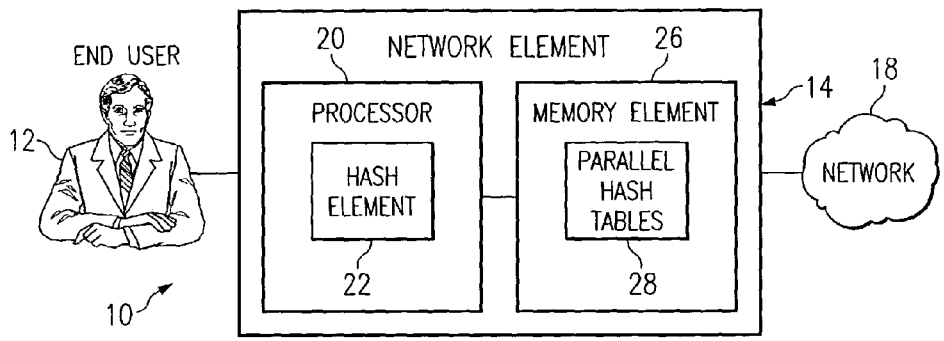
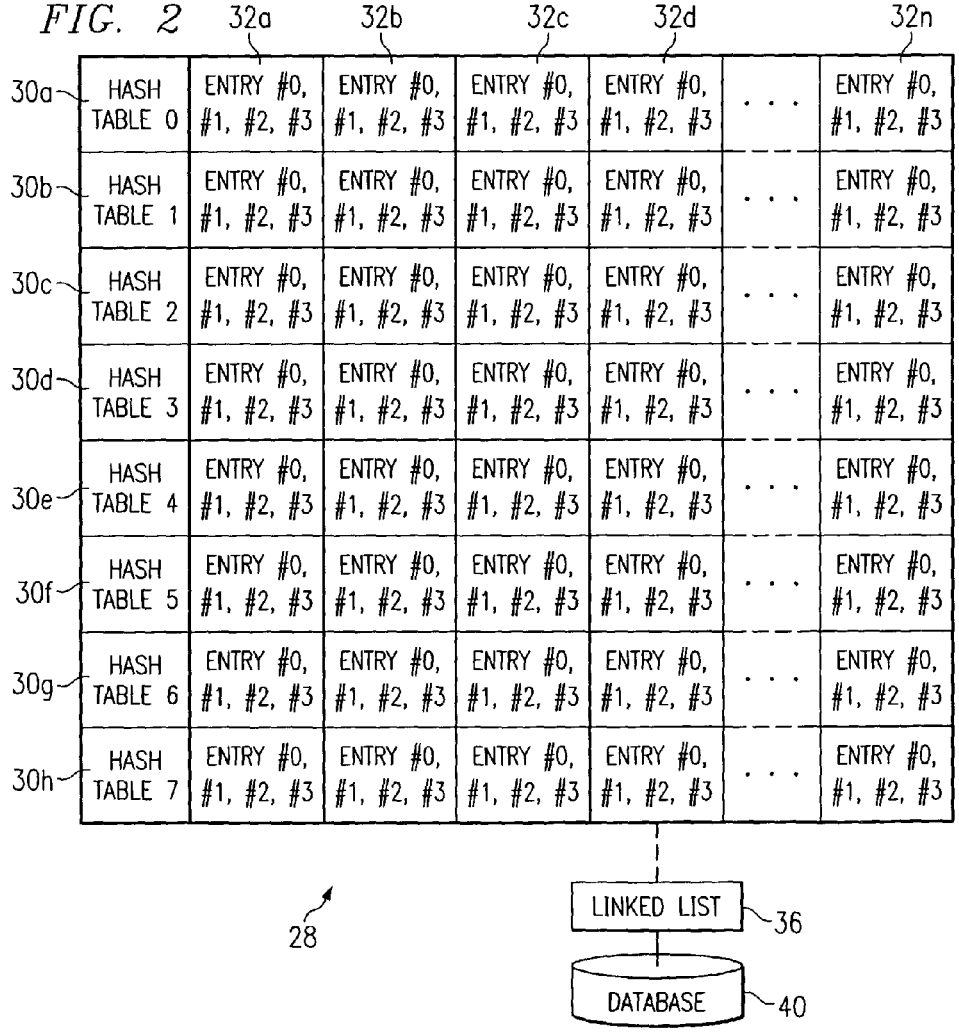

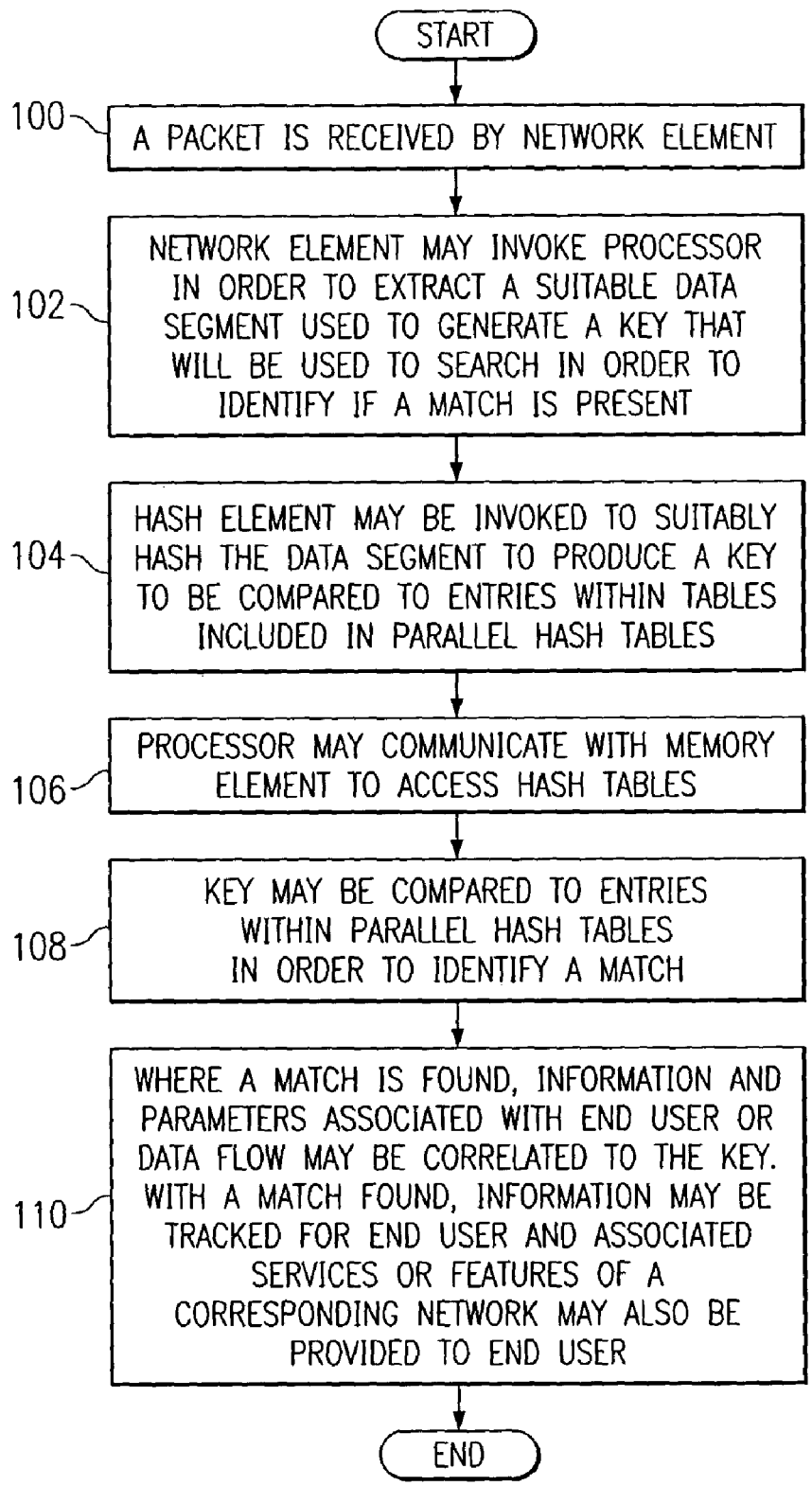

SYSTEM AND METHOD FOR IDENTIFYING DATA USING PARALLEL HASHING

TECHNICAL FIELD OF THE INVENTION

This invention relates in general to data identification and more particularly to a system and method for identifying data using parallel hashing.

BACKGROUND OF THE INVENTION

Data processing has become increasingly complex in networking architectures. The ability to properly process and route information may be important for adhering to system speed requirements and ensuring the accurate delivery of information to an intended destination. Data identification techniques may be used to extract some piece of information from a data stream in order to manage or otherwise direct the data stream to an appropriate next destination. As the volume of data segments that are propagating through a network increases, the ability to quickly process and route information to an appropriate destination becomes more challenging.

Larger data segments may present a significant problem for network equipment that attempts to maintain a given system speed while properly directing or managing the data segments within multiple information flows. Additional processing operations generally require additional time intervals necessary to adequately process the information. This results in slower system speed, as one or more elements within an associated communication system struggle to keep pace with processing speeds or data flows in an associated network. This deficiency may result in poor performance and be compounded by the immediate need to employ large amounts of memory in an associated network to accommodate the increased burden. The use of an excessive number of units of memory, in addition to inadequate system speed, presents a problem for system operators or network designers that seek to process data accurately while maintaining optimal processing speeds.

SUMMARY OF THE INVENTION

From the foregoing, it may be appreciated by those skilled in the art that a need has arisen for an improved approach for identifying data within a communications flow. In accordance with one embodiment of the present invention, a system and method for identifying data using parallel hashing are provided that substantially eliminate or greatly reduce disadvantages and problems associated with conventional information processing techniques.

According to one embodiment of the present invention, there is provided a method for identifying data that includes receiving a data stream and performing a hashing operation on a portion of the data stream in order to identify a key that reflects an identity associated with the data stream. The method further includes storing a plurality of first and second hash table entries and comparing the key to the first and second hash table entries in order to evaluate if there is a match between the key and the first and second hash table entries.

Certain embodiments of the present invention may provide a number of technical advantages. For example, according to one embodiment of the present invention, an approach for identifying data using parallel hashing is provided that offers the ability to quickly extract selected information from a data flow. This extraction generally does not inhibit system speed because multiple parallel hash tables may be employed. Each of the hash tables may include a number of entries that correspond to multiple keys, which potentially match a key associated with an incoming data flow. A match may be quickly identified by hashing a portion of the incoming packet and referencing multiple tables provided in a corresponding memory element. Where a match is found, an end user or an entity may be correlated to any suitable networking parameter, service, feature, or property. The use of parallel hash tables allows for the quick identification of an end user or an entity such that network equipment may associate an end user with a corresponding information flow for any suitable purpose.

Another technical advantage associated with one embodiment of the present invention is a result of the use of multiple hash tables. Because parallel hash tables are employed, the need to append additional amounts of memory for processing is effectively avoided. Additionally, memory does not need to be dynamically allocated to contain an associated search tree. This improves performance when new flows are inserted or provided. These elements may also further enhances system speed and reduces network congestion caused by poor performance or deficient memory processing. The multiple parallel hash tables additionally may accommodate large data segments, inclusive of a large number of key locations, that may be tested for matches in a relatively short period of time due to the prefetching operations executed. Prefetching may provide the parallel access capability. Moreover, the hash tables are not memory-dependent and operate to store or otherwise maintain a large volume of information or entries that would otherwise be held in an inferior and over-burdened memory element.

Yet another technical advantage associated with one embodiment of the present invention relates to the parallel hash tables implemented in the communication system. The tables allow a large number of key locations to be tested for matches in a relatively short period of time because of the prefetching operations and the lack of dependent memory reads. Additionally, the table space is relatively small as compared to other algorithms that may occupy significantly more space. The increased space may reduce costs associated with a piece of network equipment and further provide enhanced flexibility to an associated architecture by providing a suitable allocation for additional components or circuitry. Embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 1 is a simplified block diagram of a communication system for identifying data using parallel hashing;

FIG. 2 is a simplified block diagram of parallel hash tables included within the communication system; and FIG. 3 is a flowchart illustrating a series of example steps associated with a method for identifying data using parallel hashing.

DETAILED DESCRIPTION OF THE INVENTION

FIG. 1 is a simplified block, diagram of a communication system 10 for identifying data using parallel hashing. Communication system 10 may include an end user 12, a network element 14, and a network 18. Additionally, network element 14 may include a processor 20 that includes a hash element 22, and a memory element 26 that includes a set of parallel hash tables 28. Communication system 10 may be positioned in any suitable location within or external to a communications architecture in order to facilitate the delivery, transmission, or processing of information or data in a communications environment.

In accordance with the teachings of the present invention, communication system 10 operates to identify incoming data using an approach that invokes multiple parallel hash tables 28 stored in memory element 26. Parallel hash tables 28 may cooperate with a set of algorithms that utilize parallel hash tables 28 as the basis for identifying data. Hash tables 28 may be modified such that each hash index may reference four or more individual key values. This may allow for a hash entry to correspond to one multi-channel interface processor (MIP) cache line, approximately thirty-two bytes in an example embodiment. Parallel hash tables 28 provide enhanced processing capabilities because they may be accessed in parallel by using a prefetch capability of processor 20. Processor 20 may support eight or more (generally concurrent) prefetches and therefore twenty-nine to thirty-two keys may be retrieved in parallel for purposes of comparison. Each of parallel hash tables 28 may implement a different hash function to calculate the hash index and thus provide a suitable distribution of the keys in the hashing space.

The parallel hashing approach used to identify a data stream provides an efficient method for looking up keys in various data communications applications. In some applications, network equipment such as network element 14 may become congested or retrieve erroneous information because of large key values that need to be ascertained. Such poor performance may in turn require additional amounts of memory to be implemented, which may be expensive and space prohibitive. The use of parallel hash tables 28 avoids this problem as multiple prefetches may be effectuated concurrently without employing additional memory units.

Performing hashing operations in parallel with use of multiple algorithms may also significantly reduce the number of potential collisions that may occur in communication system 10. Four collisions in parallel may be retrieved, where the width of parallel hash tables 28 is designated as four entries wide. Accordingly, communication system 10 provides the ability to initiate N different non-dependent reads based on N different hash elements or algorithms with each returning four target elements. Where the original key extracted from the incoming data stream is produced by any of the four elements, a match exists and may be processed accordingly.

Communication system 10 may also provide an efficient approach for identifying data using parallel hash tables 28 that offer the ability to quickly extract, remove, or otherwise access information from an incoming data stream. This extraction generally does not inhibit system speed as multiple parallel hash tables 28 are invoked. Each hash table may include a number of entries that correspond to a key, which potentially matches a parameter associated with an incoming data segment. A match may thus be quickly identified by hashing the incoming packet and referencing multiple parallel hash tables 28 provided in memory element 26. Where a match is found, end user 12 or an entity associated with the data stream may be correlated to any suitable networking parameter, service, feature, or property. The use of parallel hash tables 28 may further allow for the quick and accurate identification of end user 12 or an entity such that network equipment may associate end user 12 with the corresponding information immediately after the data stream is introduced into a corresponding architecture.

Communication system 10 may additionally provide a network architecture that accommodates large data segments, inclusive of a large number of key locations that may be tested for matches in a relatively short time interval. This is a result of the prefetching operations executed by parallel hash tables 28 that may be performed concurrently. The non-dependent prefetching operations limit the taxing effects on memory element 26 that would otherwise have to maintain or store a large volume of information. Such a burden may contribute to lethargic system speed and congestion in an associated network. This deficiency may be effectively avoided with use of hash element 22 in conjunction with parallel hash tables 28.

End user 12 is a client or a customer seeking to initiate a communication in communication system 10. End user 12 may be coupled to any suitable network, where appropriate, and may be any device operable to initiate a communication, such as a computer, a personal digital assistant (PDA), a laptop, a mobile station, an electronic notebook, a telephone, or any other device, component, element, or object capable of initiating voice, video stream, or data exchanges within communication system 10. End user 12 may also be a suitable interface to the human user, such as a microphone, a display, a keyboard, or other terminal equipment (such as, for example, an interface to a personal computer). End user 12 may also be any device that seeks to initiate a communication on behalf of another entity or element, such as a program, a database, or any other component, device, element, or object capable of initiating a voice or a data exchange in a network environment. Data, as used herein, refers to any type of numeric, voice, or script data, or any type of source or object code, or any other, suitable information in any appropriate format that may be communicated from one point or one node to another.

Network element 14 is a network component that operates to receive information from end user 12 and communicate, process, or direct that information to network 18 or to any other suitable next destination. Network element 14 is offered for purposes of example only and may be substituted with any suitable network equipment, elements, devices, components, or objects where appropriate and according to particular needs. Network element 14 may be a router, a gateway, a switch, a web server, or any other suitable element that operates to receive data or information from end user 12 and communicate that information to an appropriate next destination. Alternatively, network element 14 may be a terminal node operable to process some piece of information from end user 12 and return one or more results to end user 12 or to another suitable interested piece of network equipment.

In operation of an example embodiment, end user 12 may generate a packet of information or a data stream that is communicated to network element 14. The first packet (or any subsequent packets included in the data stream) may be associated with end user 12 and analyzed by network element 14. The packet may contain information such as a source address or a destination address, for example, that may be used to generate a key for the data stream. Accompanying hardware or software within network element 14 may collect some information or extract some piece of data from the data stream and provide the data segment to processor 20. The data segment may be an Internet Protocol (IP) address in an example embodiment or, alternatively, any other piece of information that distinguishes end user 12.

Processor 20 may then communicate with memory element 26 to access hash element 22 in order to hash the incoming data segment. The result may produce a key to be compared to entries included within parallel hash tables 28. Processor 20 may also invoke or otherwise communicate with parallel hash tables 28 included within memory element 26 in order to identify if a collision is present for the corresponding data packet. In the case where there is a match identified, i.e. a collision is found, end user 12 may be correlated to the data stream such that network parameters may be associated with end user 12. Such network parameters may include port identification, quality of service, accounting, authentication, authorization, and other features that may be endemic or particular to end user 12. Alternatively, such data identification may be used for purposes of data mining, queuing, or data recording.

Processor 20 is an MIP element in accordance with one example embodiment of the present invention. Processor 20 represents a programmable device with an instruction code that provides for the processing of data or information in communication system 10. Alternatively, processor 20 may be a digital signal processor, a microprocessor, or any other suitable processing element that processes data or information in a network environment. In an alternative embodiment, processor 20 may be inclusive of memory element 26 or both elements may be included in a single module where appropriate and in accordance with particular needs. Processor 20 operates to receive a data segment from network element 14 and process that data segment by invoking hash element 22. Processor 20 may also include a pipeline element or any other suitable hardware or software that facilitates the delivery or transmission of information or data associated with end user 12.

Hash element 22 is a processing element that may extract random or selected bits of data from a data stream and create a key to be stored in parallel hash tables 28 and later referenced. Specific bits from a packet can be used to uniquely identify the bits. Keys are generally unique bits that identify a packet. Has values are the result of applying a mathematical function to the key in order to generate a pseudo-random value that has a smaller maximum value (e.g. a sixty-four-bit number reduces to a sixteen-bit number) than the original key value. Hash element 22 may include multiple algorithms corresponding to parallel hash tables 28. Generally, the more effective the hashing operation, the less likely that collisions will be present. Part of the incoming data packet within the data stream may provide source and destination address information. This information may be particularly long in a number of applications. For example, in a mobile wireless environment this information may be represented by a sixty data bit segment. In the context IP version four (IPv4), this information may be represented by thirty-two bits, whereas Ipv6 is represented by one-hundred twenty eight bits. Thus, parallel hash tables 28 provide the ability to accommodate larger key values by executing a series of prefetches concurrently.

By executing any given hash algorithm, a certain collision rate may be obtained based on the key space. By using two algorithms, a smaller collision rate may be achieved. By implementing eight or more algorithms, the collision rate may be significantly small. Hash element 22 may include multiple algorithms and operate to execute multiple prefetches, thereby prohibiting processor 20 from stalling on memory accesses. This may be executed by performing prefetches of large chunks of data while simultaneously performing part of the lookup algorithm. During the prefetch stage of the algorithm, calculation of the hash value for the subsequent table may be performed. In addition, during the prefetch stage of the algorithm (after the first table's entry has been prefetched into the cache) processor 20 may begin performing the key match process.

In operation of an example embodiment, hash element 22 may execute a process whereby an incoming read or write operation is divided into its data segment portion and its address portion. The address portion may then be transformed such that a smaller representation of the original portion of the address is generated using a hashing operation or algorithm. Thus, comparisons for read operations may be made on a smaller bit-basis, which reduces power and is generally faster. Parallel hashing represents a way of performing optimal searches and retrievals and may increase processor speed, ease data transfer, improve retrieval time, enhance efficiency, and optimize searching of data.

A number of hashing methods may be employed by hash element 22 in order to effectuate a hashing operation. For example, a division method, a multiplication method, a folding method, a length dependent method, a midsquare method, a digital-analysis method, or an addition method represent some of the hashing operations that may be used in conjunction with communication system 10. Simple parity executions may also be employed to provide a hashing feature to communication system 10. Parity represents a form of hashing or error checking that may be used in any number of communication environments. Alternatively, hash element 22 may produce a hash result using any suitable hashing operation or algorithm, the result may be subsequently compared to other hashed results. The actual complete keys may be stored in hash tables 28. It is this complete key value that is compared to determine if a match has occurred. The hash value may be used as an index to select the row of a hash table from which to make a comparison. The comparisons may be executed by initiating a number of prefetches that concurrently process a selected unit of information. Matches provide an association of end user 12 to an incoming data stream.

Memory element 26 is a data storage unit that stores information to be accessed by processor 20. Memory element 26 may include data segments to be read and processed by parallel hash tables 28. In addition, memory element 26 may include data elements to be written therefrom (or thereto) based on instructions from processor 20. Alternatively, memory element 26 may store any other suitable data or information related to the processing of data in communication system 10. Memory element 26 may be any random access memory (RAM), static random access memory (SRAM), field programmable gate array (FPGA), application-specific integrated circuit (ASIC), microcontroller, or microprocessor element, device, component or object that operates to store data or information in a network environment. Memory element 26 may include any suitable hardware, software, or program that organizes and selects data to be communicated from memory element 26 to any suitable next destination.

Parallel hash tables 28 are storage units or segments that maintain multiple tables to be referenced by processor 20 in executing one or more hashing operations. Parallel hash tables 28 provide for an efficient approach for data processing as N different non-dependent reads may be executed at the same time. The N different non-dependent reads may be based on N different hash elements or algorithms associated with parallel hash tables 28. In an example embodiment, each hash table may return four elements or entries, whereby the width of a corresponding table is four entries wide. The table could be organized to have one or more entries per row. This may be dependent on the key size and the cache line size of the associated processor. If the original key is produced or reflected by any of the four returning elements, a match is signaled. The hash algorithms implemented may be defined based on particular keys or specific parameters associated with various communication protocols. They may be specifically selected based on the type of data or properties of a given key. Additional details relating to parallel hash tables 28 are provided below with reference to FIG. 2.

Network 18 represents a series of points or nodes of interconnected communication paths for receiving and transmitting packets of information that propagate through communication system 10. Network 18 offers a communicative interface between network element 14 and a suitable next destination for information generated by end user 12. Network 18 may implement any suitable communications protocol such as dial, cable, digital subscriber line (DSL), radio, wireless local area network (WLAN), or any other suitable communications protocol that allows packet communications or tunneling to (or through) network 18 and to a suitable next destination. Network 18 may also support one or more features or services provided to end user 12. Network 18 may be any LAN, WLAN, metropolitan area network (MAN), or wide area network (WAN) or any other appropriate architecture or system that facilitates communications in a network environment. Network 18 implements a transmission control protocol/internet protocol (TCP/IP) communications language protocol in a particular embodiment of the present invention. However, network 18 may alternatively implement any other suitable communications protocol for transmitting and receiving data packets within communication system 10.

FIG. 2 is a simplified block diagram of parallel hash tables 28 included within memory element 26. The positioning of parallel hash tables 28 within memory element 26 has been offered for purposes of example only and where appropriate may be moved to any suitable location within communication system 10. For example, a separate unit may be inclusive of hash element 22 and parallel hash tables 28. Such a module may be coupled to network element 14 and accessed by processor 20 in executing one or more hashing operations. Alternatively, parallel hash tables 28 may be included within processor 20, whereby processor 20 suitably accommodates a memory element allocation.

Parallel hash tables 28 include eight separate hash tables 30*a–n* in an example embodiment. Each hash table 30*a–n* may include an entry segment 32*a–n* or index that is four entries wide. Because the width of the table is four entries wide, four elements may be returned based on the original request or query from processor 20. In addition, parallel hash tables 28 may communicate with a linked list 36 and a database 40. Linked list 36 and database 40 may be accessed in cases where a match is not found after evaluating the entries within parallel hash tables 28. The linked list may be only associated with the last entry (#3) of each row in the last table. Thus, the linked list is not walked unless the four entries (only three in the last table due to the fourth being the linked list element itself) if each of the eight hash tables failed to produce a match. In the example provided, thirty-one keys must fail to compare before the linked list search begins. Database 40 may operate to store information or data associated with one or more end users 12 or information relating to data streams within communication system 10. Additionally, linked list 36 may provide additional information to be reviewed in attempting to make a correlation between a given end user 12 or entity and the information generated thereby.

The parallel lookup algorithm implemented in communication system 10 is a multiple hash table scheme that minimizes the use of evaluating an entire corresponding table. When such evaluations are dependent on each other, the process of examining each and every entry (only after the previous entry has been examined) is commonly referred to as 'walking a linked list.' However, because memory performance or memory bandwidth is not always as proficient as processor performance (potentially associated with central processing unit core frequency), applications may be more memory-dependent than processor-dependent. Parallel hash tables 28 capitalize on this feature by implementing multiple tables that may be accessed concurrently. The algorithm may utilize eight or more hash tables, where parallel hash tables 28 are subdivided into eight physical memory banks that allow for eight concurrent prefetches. The number of hash tables may be processor/application dependent. I may be a few as one or as many as need be. The use of eight is offered for purposes of example and teaching only. Each of hash tables 30*a–n* may implement a different hash algorithm to generate a hash index such that a given key may have eight unique hash index values. The ability to prefetch hash tables 30*a–n* in parallel translates into hash tables 30*a–n* not relying on dependent reads and hash tables 30*a–n* making use of an MIP's (or any other processor's) prefetch instruction capability such that eight memory banks are accessed simultaneously.

The cache line associated with processor 20 may be thirty-two bytes and thus each memory prefetch may obtain thirty-two bytes of data. In a single cache line of thirty-two bytes, four sixty-four bit keys may be contained. If the key size is smaller than sixty-four bits, then the remaining bits may be used to store data associated with that key. With this structure, memory element 26 may be organized such that each hash table 30*a–n* may be contained within a single bank of segmented memory. In addition, a hash value may reference four contiguous values and thus for each hash lookup, four keys may be checked for a match. Accordingly, for the cost or space allotment for eight memory reads, sixteen to thirty-one keys may be checked for a match (in the case of the eight table implementation as used for purposes of example and illustrated in FIG. 2). The thirty-second key may be used for the linked list element.

The time to calculate the hashed address is relatively small compared to the amount of time required to retrieve the memory at the corresponding address. The time to calculate the hash value is dependent on the actual hash function used. A time delay may be provided that reflects the amount of time processor 20 delays in waiting on the hash row from the first table. The key to the entry matching function may not be initiated until the first table's data is available in the cache. In one embodiment, the use of the simplest hash function is implemented for the first table because it gates the first prefetch and is not performed in parallel with any other operation.

The parallel lookup algorithm may allow for the data storage area to grow larger than the initial table size as illustrated in FIG. 2. The table expansion may occur due to specific key hash rows being completely filled at the time the key is added. This does not necessarily translate into every entry being consumed in the corresponding data storage area.

The hash table rows may not necessarily be contiguous with the next or previous row in the same hash table. The rows for each hash table 30a–n may be interleaved with all hash tables in a main corresponding table. Thus, in FIG. 2 the x-axis and the y-axis of the main table represent the byte addresses. For example, the first entry in each row of hash table 2 30c may have the lower two segments of its address equal to '0×40.' The reason for this may be to take advantage of memory banking, which generally refers to the interleaving of physical memory devices with a virtual memory map. The actual interleaving may be dependent on how a memory controller is initialized in a particular system. Typically this interleaving or stripping may be executed on a cache line size or every thirty-two bytes. One of the advantages of memory interleaving is that memory requests may be posted simultaneously to different memory banks.

A single row in hash tables 30a–n may contain four sixty-four bit entries. A single entry may be further expanded to illustrate that if the key size is less than sixty-four bits, then the remaining bits may be used to store user data associated with a given key. In some cases, the remaining bits may be sufficient for the application and therefore a secondary table is not necessary. The last table (hash table 7 30n) may be treated as a special case. Hash table seven 30n is illustrated as the last table in FIG. 2 and its fourth entry (entry #3) may represent a linked list pointer rather than a key entry. This may be used to handle the case where all the rows for a specified key are already filled with existing entries. The algorithm may then proceed to a linked list search, implementing linked list 36 and potentially database 40.

Because the attached table 30a–n is four entries wide, when a hash index is created, four entries may be retrieved into the cache line. Accordingly, four collisions may be compared quickly. This is in contrast to normal hashing operations where a hash is performed on one entry and, where no match is found after the comparison, the algorithm may proceed and index the next collision. This 'walking the tree' represents a significant time deficiency in processing operations and is effectively avoided with use of parallel hash tables 28.

A secondary parallel lookup algorithm table may be implemented when more data is required to be stored with an entry that can be stored in hash tables 30a–n. The amount of data that may be stored in the main table may be approximately sixty-four bits, minus the length of the key as provided in the example. The secondary table may utilize the same indexing scheme as the main table and therefore there is a one-to-one relationship between main table entries and secondary table entries. The reason the secondary table is not contained within the main table is to optimize the search time such that a single cache entry contains only four keys. If the amount of user data is relatively small, it may be preferred to make each entry in the secondary table contain all of the data for that particular key. In cases where the user data is large, the secondary table may contain only a reference to where the actual user data exists. This may operate to conserve overall memory consumption.

In operation, a selection may be executed for a row in a corresponding hash table 30a–n that contains four entries or key values to match. A row in hash tables 30a–n may be contained in a single cache line. The hash table rows may be prefetched and thus add a degree of parallelism to memory accesses. The last table may provide a coupling to linked list 36 using a pointer element that provides a mechanism for the algorithm to continue to function when a row in the last table becomes full.

For each of the configured hash tables 30a–n, the search algorithm may be used to determine the hash value for the key being searched for using the supplied hash functions. The returned hash value may then be used to calculate the address of the row of a given hash table that may contain this key. Prefetches may then be executed for the table row in the cache. For each of the four entries of the pre-calculated rows in all of hash tables 30a–n, the key stored in the entry may be compared to the key to which a search is directed. Where a match occurs, the entry may be returned to end user 12 by processor 20. When an entry is not found, the search algorithm may access linked list 36 or check to see if the entry is included within database 40. If the entry is to be added to database 40, appropriate steps may be performed in order to do so. Alternatively, a no entry found message may be returned to processor 20 or end user 12.

Where no entry was found as a match, the algorithm may inspect each entry/row/table that was examined, but in this examination a checking may occur for unused entries. The first entry found by the algorithm that is unused may be implemented in order to address this need. This causes the first table to be filled first, then spilling over into subsequent tables, which has the beneficial effects in that searches are more likely to match in the first table and thus not require additional searching or processing. After the entry has been appropriately filled with the key being searched for, the new entry may be returned to end user 12 with an indication that the entry is new.

In operation, a packet may propagate from end user 12 to network element 14. The example provided is described in conjunction with a lower bit, four lower bits, or eight lower bits for purposes of teaching. The packet includes a key that may be used to search. For example, for a hash algorithm that is a single bit the corresponding IP address is 0.0.0.1–255, where a destination address may be sought in the range of 0.1–255. When the packet arrives at network element 14, a piece of code on a forwarding engine (inclusive of packet classification operations) may extract the destination IP address, which may be a thirty-two bit number. Hash element 22 may then take that thirty-two bit number and apply eight different hash algorithms to it. In the example provided, only the four lower bits are of interest. A hash may then be executed on the four bits, for example, by XORing them together, which potentially produces sixteen values.

When the first hash was executed, one of potentially sixteen values was returned. If we assume that the hash value is the number two, now we may be directed to number two of hash table zero and extract out each entry. Thus, when we compare the key received from the packet to the key that is in the entry, if a match is provided then this signifies that there is a hit. Accordingly, the data embedded along with that key may be accessed, read, or processed. The data may be any suitable information, such as an index for control information associated with a particular IP address corresponding to end user 12. Thus the key is abstracted and then a call up search is executed to see if the key exists in one or more of hash tables 30a–n. If the key has never been used before or is new, database 40 may then be accessed (or any other suitable location that provides address data or information) to access the IP address and direct the information or data segment appropriately.

FIG. 3 is a flowchart illustrating a series of example steps associated with a method for identifying data. The method begins at step 100 where a packet is received by network element 14. At step 102, network element 14 may invoke processor 20 in order to extract suitable information used to generate or otherwise identify a key that will be used to search in order to identify a match. The key may be used to generate a hash index that may be used to reference a specific location in hash tables 28. At step 104, hash element 22 may be used to suitably hash the data segment to produce the key to be compared to entries within tables included in parallel hash tables 28. At step 106, processor 20 may communicate with memory element 26 in order to access hash tables 30a–n included within parallel hash tables 28. At step 108, the key may be compared to entries within parallel hash tables 28 in order to identify a match. The match may be based on the hash index generated by the key. Where a match is found, information and parameters associated with end user 12 may be correlated to the key at step 110. In cases where there is not a match, additional identification operations may take place that implement linked list 36 and database 40. Once the match is found, information may be tracked by end user 12 and associated services or features of a corresponding network 18 may also be provided to end user 12.

Some of the steps illustrated in FIG. 3 may be changed or deleted where appropriate and additional steps may also be added to the flowchart. These changes may be based on specific system architectures or particular networking arrangements or configurations and do not depart from the scope or the teachings of the present invention. In addition, these steps may be automated or combined where appropriate as a result of software or hardware implemented in any one of the elements included within communication system 10. Moreover, these steps may be varied in the context of other communication applications, such as messaging, voice, wireless applications, or script for example.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 10, these elements may be rearranged or positioned in order to accommodate particular networking architectures. In addition, these elements may be provided as separate external components to communication system 10 or each other where appropriate. The present invention contemplates great flexibility in the arrangement of these elements as well as their internal components.

In addition, although FIGS. 1 and 2 illustrate an arrangement of communication system 10 and parallel hash tables 28, numerous other components may be used in combination with these elements or substituted for these elements without departing from the teachings of the present invention. For example, parallel hash tables 28 may include any suitable identification element that operates to utilize a segment of data from end user 12 in order to correlate end user 12 to an IP address or some other identifying mechanism or element. This may be inclusive of communications with any suitable look up element or component in a corresponding database where appropriate. Additionally, such variations may be dependent on the type of communication propagating through communication system 10. For example, in a messaging context, parallel hash tables 28 may access a database in order to properly identify end user 12 using a corresponding IP address. In alternative embodiments, communication applications other than those described herein may benefit from the teachings of the present invention. Any system that seeks to communicate data between two nodes or two points in a network may implement communication system 10 in order to properly identify data using parallel hash tables.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. An apparatus for identifying data, comprising:
 a network element operable to receive a data stream, the network element including:
  a processor; and
  a memory element coupled to the processor, the memory element including a first hash table operable to store a plurality of first hash table entries and a second hash table operable to store a plurality of second hash table entries, wherein the processor performs a hashing operation on a portion of the data stream in order to identify a key that reflects an identity associated with the data stream, the key being used to generate a hash index used to correlate a match between the key and a selected one or more of the entries in the first and second hash tables, and wherein the memory element includes third, fourth, fifth, sixth, seventh, and eighth hash tables, each of which are operable to store multiple entries that may be compared to the key in order to evaluate if there is a match between the key and the entries in the hash tables.

2. The apparatus of claim 1, further comprising:
 a hashed element included within the processor and operable to execute the hashing operation on the data stream in order to identify the key.

3. The apparatus of claim 2, wherein the hashed element stores a plurality of hashing operation algorithms, one or more of which correspond to each of the first and second hash tables included in the memory element.

4. The apparatus of claim 1, wherein a selected one of the hash tables is coupled to a linked list operable to provide internet protocol (IP) address information associated with the data stream when there are no matches found in the hash tables for the key.

5. The apparatus of claim 4, further comprising:
 a database coupled to the linked list and operable to store IP address information associated with the data stream.

6. The apparatus of claim 1, wherein the width of each of the hash tables is one or more entries wide, each of the hash table entries in the hash tables including a key element and a data segment.

7. The apparatus of claim 1, wherein the match is used to identify one or more networking parameters for an entity associated with the data stream.

8. A computer implemented method for identifying data, comprising:
 receiving a data stream;
 performing a hashing operation on a portion of the data stream in order to identify a key that reflects an identity associated with the data stream;
 storing a plurality of first and second hash table entries;

comparing the key to the first and second hash table entries in order to evaluate if there is a match between the key and the first and second hash table entries; and storing third, fourth, fifth, sixth, seventh, and eighth hash table entries, each of which are operable to be compared to the key in order to evaluate if there is a match between the key and the hash table entries.

9. The method of claim 8, wherein a selected one of the hash table entries are coupled to a linked list operable to provide internet protocol (IP) address information associated with the data stream when no match is found for the key.

10. The method of claim 4, further comprising:

accessing a database coupled to the linked list in order to retrieve IP address information associated with the data stream when no match is found for the key.

11. The method of claim 8, wherein the hash table entries are stored in a plurality of hash tables, the width of each of the hash tables being one or more entries wide, each of the hash table entries in the hash tables including a key element and a data segment.

12. The method of claim 8, further comprising:

using the match to identify one or more networking parameters for an entity associated with the data stream.

13. The method of claim 8, further comprising:

invoking a selected one of a plurality of algorithms to perform the hashing operation such that the key is identified.

14. A system for identifying data, comprising:

a network element operable to receive a data stream, the network element including:

a processor;

a memory element coupled to the processor, the memory element including a first hash table operable to store a plurality of first hash table entries and a second hash table operable to store a plurality of second hash table entries, wherein the processor performs a hashing operation on a portion of the data stream in order to identify a key that reflects an identity associated with the data stream, the key being used to generate a hash index used to correlate a match between the key and one or more of the entries in the first and second hash tables, and wherein a hashed element is included within the processor and operable to execute the hashing operation on the data stream in order to identify the key, the hashed element storing a plurality of hashing operation algorithms, one or more of which correspond to each of the first and second hash tables included in the memory element; and a database coupled to a linked list and operable to provide internet protocol (IP) address information associated with the data stream, wherein a selected one of the hash tables is coupled to the linked list that is operable to provide IP address information associated with the data stream when there are no matches found in the hash tables for the key.

15. The system of claim 14, wherein the memory element includes third, fourth, fifth, sixth, seventh, and eighth hash tables, each of which are operable to store multiple entries that may be compared to the key in order to evaluate if there is a match between the key and one or more of the entries in the hash tables.

16. The system of claim 14, wherein the width of each of the hash tables is one or more entries wide, each of the hash table entries in the hash tables including a key element and a data segment, and wherein the match is used to identify one or more networking parameters for an entity associated with the data stream.

17. A system for identifying data in an electronic processing environment, comprising:

means for receiving a data stream;

means for performing a hashing operation on a portion of the data stream in order to identify a key that reflects an identity associated with the data stream and that is used to generate a hash index;

means for storing a plurality of first and second hash table entries;

means for correlating the hash index to one or more of the first and second hash table entries in order to evaluate if there is a match between the key and the first and second hash table entries; and means for providing storage that includes a linked list, the storage being operable to provide internet protocol (IP) address information associated with the data stream, wherein a selected one of the hash tables is coupled to the linked list that is operable to provide IP address information associated with the data stream when there are no matches found in the hash tables for the key.

18. A computer readable medium having code for identifying data, the code operable to:

receive a data stream;

perform a hashing operation on a portion of the data stream in order to identify a key that reflects an identity associated with the data stream;

store a plurality of first and second hash table entries;

compare the key to the first and second hash table entries in order to evaluate if there is a match between the key and the first and second hash table entries; and provide storage that includes a linked list, the storage being operable to provide internet protocol (IP) address information associated with the data stream, wherein a selected one of the hash tables is coupled to the linked list that is operable to provide IP address information associated with the data stream when there are no matches found in the hash tables for the key.

* * * * *